July 2, 1935.  L. H. MORSE  2,006,364
INKING ROLLER FOR PRINTING MACHINES
Filed Nov. 18, 1931
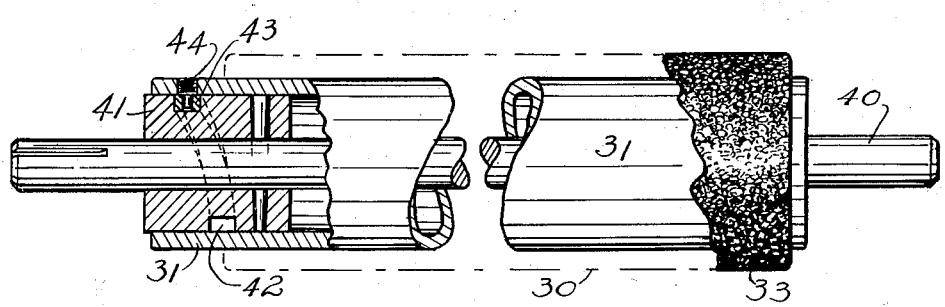
FIG. 1
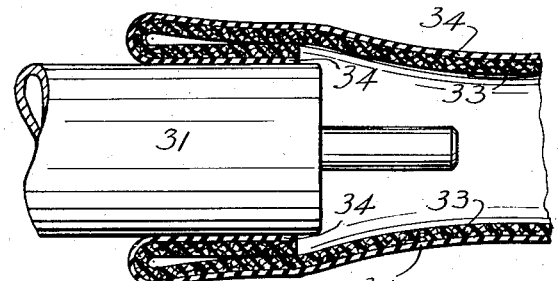
FIG. 2
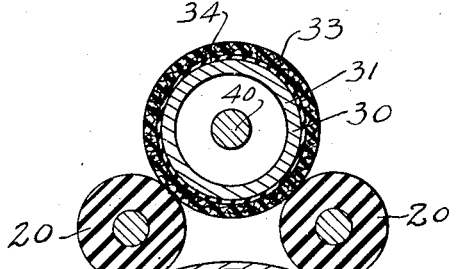
FIG. 3
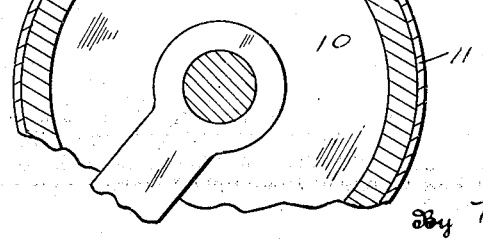
Inventor
Lawrence H. Morse
By Dakó, Golnick & Tears,
Attorneys Patented July 2, 1935

2,006,364

UNITED STATES PATENT OFFICE 2,006,364

INKING ROLLER FOR PRINTING MACHINES

Lawrence H. Morse, Cleveland, Ohio, assignor to Multigraph Company, a corporation of Delaware Application November 18, 1931, Serial No. 575,824

8 Claims. (Cl. 101—349)

This invention relates to an ink-supply roller for printing machines, the object being to furnish a roller to which ink may be externally applied from time to time and which will gradually give up such ink to pass to the printing member during the operation of the printing machine. I have found that very satisfactory results may be attained by making the surface of the supply roller of sponge rubber, such surface retaining considerable quantities of ink and gradually giving it up during the operation of the machine.

I find that the small pockets provided by sponge rubber not only hold much more ink than fabric or felt heretofore employed, but, on the other hand, will dispense ink more readily to the contacting roll. Moreover, a sponge rubber surface may be effectively moved along such contacting roll and result in an even distribution of ink thereto. Accordingly, I have increased the efficiency of the roller in operation as well as its capacity to hold ink.

My invention comprises a sponge rubber inking roller broadly; also the more particular embodiment thereof hereinafter explained in connection with the drawing, which illustrates a preferred form, and also the method of making such a roller.

In the drawing, Fig. 1 is an elevation, partly in section and partly broken away, of my inking roller; Fig. 2 is a diagrammatical elevation showing the core and rubber sleeve as it is being mounted thereon; Fig. 3 is a cross section through a plate-carrying member of a printing machine and through an inking system embodying my sponge rubber roller.

In Fig. 3, 10 indicates a suitable rotary drum on which is mounted the printing surface, indicated as a plate 11, which may be planographic or relief or intaglio, as desired. Contacting with the plate 11 are a pair of ink-transfer rollers 20 spaced apart on parallel axes and preferably resting by gravity on the plate surface, and either frictionally driven thereby, or geared with the drum 10, as is well understood. My sponge rubber inking roller designated 30 in Figs. 1 and 3 preferably rests by gravity on the two rolls 20, being of materially greater diameter than the distance between the rolls, and may be rotated by frictional contact with the rolls 20 or gear-driven as desired.

The roller 30, as shown, comprises a metal shell 31 on the exterior of which is secured the sponge rubber facing. Preferably, there is an external sponge rubber sleeve designated at 33 mounted on a much thinner sleeve 34 of Fig. 4 of continuous or sheet rubber being intimately united therewith at the time of vulcanization. The sheet rubber sleeve is effectively cemented to the metal shell 31 of the roller; and accordingly I have provided in effect a sponge rubber roller or more specifically a core having a cylindrical facing of sponge rubber.

In mounting the sponge rubber sleeve on the metal shell 31, I prefer to make the sleeve first with the sponge rubber to be on the inside and the sheet rubber to be united to it on the outside thereof, as shown in the right-hand portion of Fig. 2. Such a sleeve has an interior diameter materially less than the exterior of the metal shell 31. Now, in placing this rubber sleeve on the metal shell, I first turn into itself the end of the rubber sleeve shown in Fig. 2 and apply it to the metal shell, and then gradually introvert the rubber sleeve so that the sponge rubber originally on the inside comes on to the outside. This action takes place as the sleeve is progressing lengthwise of the roller, and at the same time, or preceding such placement, I supply cement to the exterior of the core or to the sheet rubber tube so that the rubber facing becomes effectively cemented to the metal core.

The metal core 31 may be carried in any suitable manner. However, one of the advantages of the sponge rubber facing is that it may readily be used to distribute the ink to a contacting transfer roller by sliding movement with reference thereto. Accordingly, when my inking roller is mounted in the machine, means are preferably provided for moving it longitudinally, or for moving longitudinally the ink transfer roller with which it coacts.

In the embodiment shown in the drawing, the ink-transfer rollers 20 are intended to be non-shiftable in an axial direction and the ink-supply roller shiftable as well as rotatable. I have shown this as accomplished by providing a stationary supporting shaft 40 at the axis of the supply roller and pinning to this shaft hubs 41 on which the roller shell 31 is journalled, and in one of these hubs I make a cam groove 42, which is occupied by a roller 43 secured by a pin 44 to the shell 41. The result is that the roller is reciprocated longitudinally as it rotates.

My sponge rubber roller may be cheaply constructed and is durable in service. The ink may be very readily applied to its exterior from time to time by means of an ink knife or an ink tube or in other manner. Comparatively large quantities of such ink are retained in the pores or pockets of the sponge rubber, but, in the operation, this ink passes as needed to the contacting ink transfer roller and thence to the printing form, and this transfer is maintained even and the ink smooth by the reciprocatory relation between the supply roller and the transfer roller. I can thus print a comparatively large number of copies, all effectively inked, without having to resupply the inking roller or change it in any manner.

I claim:

1. In an inking system for a printing machine, the combination with an ink transfer roller, of an ink supply roller having a sponge rubber exterior contacting with the transfer roller.

2. In a printing machine, the combination with a printing surface of an ink-transfer roller contacting with said surface, an ink-supply roller having a sponge rubber exterior contacting with the ink-transfer roller, and means for reciprocating the supply roller axially.

3. The combination with a rotary member carrying a printing plate, of an ink-transfer roller engaging such plate, and an ink-supply roller engaging the ink-transfer roller, said supply roller having an exterior surface of sponge rubber.

4. The combination, with a printing surface movably mounted, of a pair of ink-transfer rollers mounted side by side and spaced apart and contacting with the printing surface during the movement of the latter, and an ink-supply roller of larger diameter than the space between the ink-transfer rollers, said supply roller resting on both transfer rollers and having an exterior surface of sponge rubber.

5. The combination, with an arcuate printing plate rotatably mounted, of a pair of ink-transfer rollers mounted side by side and spaced apart and contacting with the printing plate during the rotation of the latter, and an ink-supply roller of larger diameter than the space between the ink-transfer rollers, said supply roller resting on both transfer rollers and having an exterior surface of sponge rubber, and means for reciprocating the supply roller axially as it rotates in contact with the two transfer rollers.

6. The combination, in a printing machine, of a printing member, a form roll coacting therewith, and means for supplying ink to the form roll, comprising a roller having a core and embracing envelope of sponge rubber on its exterior in contact with the form roll.

7. In an inking system for a printing machine, the combination with a transfer roller, of a sponge rubber inking roller coacting therewith, and means for reciprocating one of said rollers axially while in contact with the other to spread the ink transferred.

8. In an inking system for a printing machine, the combination with a transfer roller and a supply roller coacting therewith, said supply roller comprising a core and an enveloping surface of sponge rubber, and means for reciprocating the supply roller as it rotates.

LAWRENCE H. MORSE.